(12) United States Patent
Lee et al.

(10) Patent No.: US 10,497,992 B2
(45) Date of Patent: Dec. 3, 2019

(54) WASHER FOR DETECTING ELECTROLYTE LEAKAGE, AND SECONDARY BATTERY COMPRISING SAME

(71) Applicant: LG CHEM, LTD., Seoul (KR)

(72) Inventors: Je-Jun Lee, Daejeon (KR); Hang-Soo Shin, Daejeon (KR); Do-Gyun Kim, Daejeon (KR); Byoung-Gu Lee, Daejeon (KR); Sang-Sok Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/554,311

(22) PCT Filed: Apr. 15, 2016

(86) PCT No.: PCT/KR2016/003949
§ 371 (c)(1),
(2) Date: Aug. 29, 2017

(87) PCT Pub. No.: WO2016/167602
PCT Pub. Date: Oct. 20, 2016

(65) Prior Publication Data
US 2018/0053974 A1      Feb. 22, 2018

(30) Foreign Application Priority Data
Apr. 15, 2015   (KR) .................. 10-2015-0053158

(51) Int. Cl.
| | | |
|---|---|---|
| *H01M 10/48* | (2006.01) | |
| *H01M 2/04* | (2006.01) | |
| *H01M 10/0525* | (2010.01) | |
| *H01M 10/42* | (2006.01) | |

(52) U.S. Cl.
CPC ......... *H01M 10/488* (2013.01); *H01M 2/043* (2013.01); *H01M 2/0478* (2013.01); *H01M 10/0525* (2013.01); *H01M 10/4228* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2004/0142236 A1* | 7/2004 | Kim | ............... H01M 2/0202 |
| | | | 429/144 |
| 2006/0263684 A1 | 11/2006 | Song | |
| 2012/0148888 A1* | 6/2012 | Yun | ............... H01M 2/021 |
| | | | 429/82 |

FOREIGN PATENT DOCUMENTS

| | | | |
|---|---|---|---|
| JP | 55069956 | * | 5/1980 |
| JP | S55-69956 A | | 5/1980 |
| JP | 2001-338698 A | | 12/2001 |
| JP | 2009-87900 A | | 4/2009 |
| JP | 2013-239380 A | | 11/2013 |
| KR | 20-1998-035077 U | | 9/1998 |
| KR | 10-2006-0059714 A | | 6/2006 |
| KR | 10-0614399 B1 | | 8/2006 |
| KR | 10-0696782 B1 | | 3/2007 |
| KR | 10-1006883 B1 | | 1/2011 |
| KR | 10-2014-0136245 A | | 11/2014 |

OTHER PUBLICATIONS

KR 10-2006-0059714—translation.*
International Search Report issued in PCT/KR2016/003949 (PCT/ISA/210), dated Jul. 29, 2016.

* cited by examiner

*Primary Examiner* — Ladan Mohaddes
(74) *Attorney, Agent, or Firm* — Birch, Stewart, Kolasch & Birch, LLP (57) ABSTRACT

The present disclosure relates to a case for a secondary battery and a secondary battery having the same. More specifically, it relates to a case for a secondary battery having a washer for detecting leakage with a structure improved so as to check leakage of an electrolyte and a secondary battery having the same.

A lithium ion secondary battery according to the present disclosure provides an effect of easily checking the leakage of an electrolyte with naked eyes through the color change of a washer when a trace amount of the electrolyte leaks.

10 Claims, 6 Drawing Sheets

WASHER FOR DETECTING ELECTROLYTE LEAKAGE, AND SECONDARY BATTERY COMPRISING SAME

TECHNICAL FIELD

The present application claims priority to Korean Patent Application No. 10-2015-0053158 filed on Apr. 15, 2015 in the Republic of Korea, the disclosures of which are incorporated herein by reference. The present disclosure relates to a washer for a secondary battery and a secondary battery having the same. More specifically, it relates to a washer for detecting leakage with an improved structure so as to easily check leakage of an electrolyte outside a battery and a secondary battery having the same.

BACKGROUND ART

In general, a secondary battery is configured as an electrode assembly composed of a cathode, an anode and a separator interposed between the cathode and the anode, of a stacked or wound configuration, a battery casing made of a metal can or a laminate sheet, and an electrolyte filled in the battery casing. The recently developed lithium secondary battery is widely used in electronic devices such as cellular phones, notebook computers, electric vehicles, etc.

The secondary battery is classified into a liquid electrolyte battery and a polymer electrolyte battery depending on the electrolyte used. In general, a battery using a liquid electrolyte is called a lithium ion battery and a battery using a polymer electrolyte is called a lithium polymer battery. The secondary battery is prepared into various shapes, including cylindrical, prismatic and pouch-type shapes.

In general, a secondary battery includes a can as a battery casing, an electrode assembly accommodated inside the can, a cap assembly coupled to an open upper end of the can, a lead for electrically connecting an anode or cathode terminal to a protection circuit and a washer coupled to an upper side of a cap plate. However because the washer is located at the upper side of the cap plate, an electrolyte injection hole is covered by the washer. For this reason, the washer has to be removed to check if there is leakage of the electrolyte. In addition, when a trace amount of the electrolyte leaks, the leakage is not easily detected with naked eyes outside of the battery and the electrolyte leakage goes unnoticed.

DISCLOSURE

Technical Problem

The present disclosure is designed to solve the above-described problems, and therefore the present disclosure is directed to providing a washer with an improved structure so as to quickly check leakage of an electrolyte and a secondary battery having the same. It will be easily understood that the objects and advantages of the present disclosure may be realized by the means shown in the appended claims and combinations thereof.

Technical Solution

The present disclosure provides a washer for a secondary battery for solving the technical problem described above. A first aspect of the present disclosure relates to a washer. The washer includes a polymer film layer; and an adhesion layer formed on one side of the film layer.

A second aspect of the present disclosure relates to the first aspect wherein the adhesion layer contains an adhesive component and an indicator component and experiences color change upon contact with an electrolyte.

A third aspect of the present disclosure relates to any of the first and second aspects wherein the polymer film layer is made of a transparent material or a semitransparent material so that the color change of the adhesion layer may be observed with naked eyes from outside.

A fourth aspect of the present disclosure relates to any of the first to third aspects, wherein the polymer film layer contains one or more polymer resin selected from a group consisting of a polyolefin-based polymer resin, an acryl-based polymer resin, a polycarbonate-based polymer resin, a vinyl-based polymer resin, an ABS (acrylonitrile butadiene styrene) resin, a polystyrene-based polymer resin, polycarbonate-based polymer resin, tetrafluoroethylene, Teflon, polybutyl terephthalate and polyethylene terephthalate.

A fifth aspect of the present disclosure relates to any of the first to fourth aspects wherein the polyolefin-based resin is one or more selected from a group consisting of low-density polyethylene (LDPE), linear low-density polyethylene (LLDPE), high-density polyethylene (HDPE), ultra-high-molecular-weight polyethylene (UHMWPE), polypropylene, polybutene, polymethylpentene and a copolymer thereof.

A sixth aspect of the present disclosure relates to any of the first to fifth aspects wherein the adhesive component comprises one or more selected from a group consisting of an acryl-based adhesive compound, a rubber-based adhesive compound, a silicone-based adhesive compound and a vinyl ether-based adhesive compound.

A seventh aspect of the present disclosure relates to the sixth aspect wherein the acryl-based adhesive compound is a homopolymer or a copolymer of an acrylic acid ester based-monomer such as butyl acrylate, isononyl acrylate, 2-ethylhexyl acrylate, etc., or a copolymer of the acrylic acid ester based-monomer with another monomer such as acrylic acid, 2-hydroxyethyl acrylate and vinyl acetate, etc.

An eighth aspect of the present disclosure relates to any of the first to seventh aspects wherein the indicator component comprises one or more selected from a group consisting of thymol blue, bromophenol blue, methyl orange, bromophenol green, methyl red, bromocresol purple, bromothymol blue (BTB), phenolphthalein, thymolphthalein, indigo carmine and phenol red.

The present disclosure also relates to a secondary battery. A ninth aspect of the present disclosure relates to a secondary battery wherein an electrode assembly of a cathode/separator/anode structure is accommodated in a metal can, wherein a washer is mounted on the upper side of a cap assembly which is coupled to an open upper end of the metal can in which the electrode assembly is accommodated, and the washer is the washer described above.

A tenth aspect of the present disclosure relates to the ninth aspect wherein the washer is fixed to the upper side of the cap assembly through adhesion or mechanical coupling.

An eleventh aspect of the present disclosure relates to any of the first to tenth aspects wherein the washer has a thickness of 0.05-2 mm.

Advantageous Effects

A lithium ion secondary battery according to the present disclosure provides an effect of easily checking the leakage of an electrolyte with naked eyes through the color change of a washer when a trace amount of the electrolyte leaks out of a battery can.

DESCRIPTION OF DRAWINGS

The accompanying drawings illustrate preferred embodiments of the present disclosure and together with the following detailed description, serve to provide further understanding of the technical features of the present disclosure, and thus, the present disclosure is not construed as being limited to the drawings.

FIG. 1b is a cross-sectional view along the line A-A' of FIG. 1a.

BEST MODE

It should be understood that the terms or words used in the specification and the appended claims should not be construed as limited to general or dictionary meanings, but should be interpreted based on the meanings and concepts corresponding to technical aspects of the present disclosure on the basis of the principle that the inventor is allowed to define terms appropriately for the best explanation. Therefore, the description and drawings proposed herein are just preferable examples for the purpose of illustrations only, not intended to limit the scope of the disclosure, so it should be understood that other equivalents and modifications could be made thereto without departing from the scope of the disclosure.

The present disclosure relates to a washer for a secondary battery including a polymer film layer and an adhesion layer formed on one side of the film layer and a secondary battery including the washer.

Figure 1A:
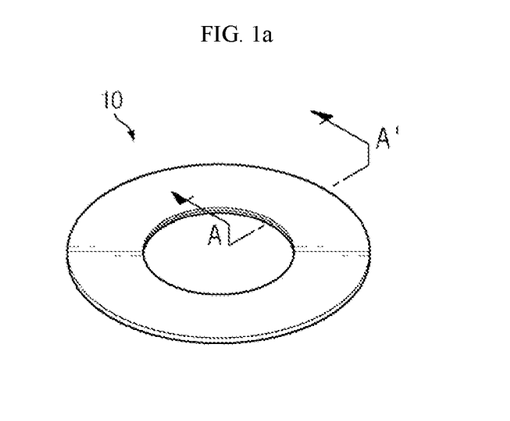
FIG. 1a schematically shows the configuration of a washer according to a specific exemplary embodiment of the present disclosure.
Figure 1B:
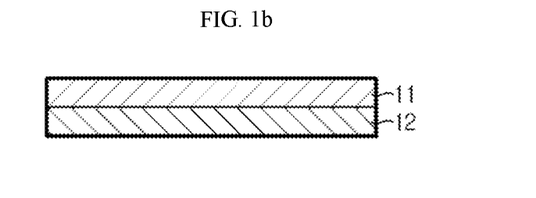

FIG. 1a and FIG. 1b schematically show the configuration of a washer according to a specific exemplary embodiment of the present disclosure. In particular, FIG. 1b is a cross-sectional view along the line A-A' of FIG. 1a and shows the layered structure of the washer. Hereinafter, the present disclosure is described in detail referring to the attached drawings.

In general, a washer mounted at a cap assembly of a secondary battery serves basically to improve electrical insulation, protect a battery cell from external impact and improve mechanical strength of members mounted on the battery cell.

Because the washer according to the present disclosure contains an indicator component in the adhesion layer, it allows easy checking of the leakage of an electrolyte with naked eyes in addition to the basic functions of the washer described above, since the color of the adhesion layer is changed by the electrolyte.

Referring to FIG. 1a and FIG. 1b, a washer 10 according to the present disclosure includes a polymer film layer 11; and an adhesion layer 12 formed on one side of the film layer. The adhesion layer contains an adhesive component and an indicator component. The indicator component allows for detection of the leakage of an electrolyte because its color changes upon contact with the electrolyte.

In the present disclosure, the polymer film layer may be made of a transparent material or a semitransparent material so that the color change of the adhesion layer can be easily observed with naked eyes from outside.

In the present disclosure, the polymer film layer contains a polymer resin. The polymer resin may contain one or more polymer resin such as a polyolefin-based polymer resin, an acryl-based polymer resin, a polycarbonate-based polymer resin, a vinyl-based polymer resin, an ABS (acrylonitrile butadiene styrene) resin, a polystyrene-based polymer resin, a polycarbonate-based polymer resin, tetrafluoroethylene, Teflon, polybutyl terephthalate, polyethylene terephthalate, etc., although not being specially limited thereto.

Non-limiting examples of the polyolefin-based polymer resin include low-density polyethylene (LDPE), linear low-density polyethylene (LLDPE), high-density polyethylene (HDPE), ultra-high-molecular-weight polyethylene (UHMWPE), polypropylene, polybutene, polymethylpentene, copolymers thereof, etc. In a specific exemplary embodiment of the present disclosure, the polymer film layer contains one or more selected from a group consisting of polypropylene, a polycarbonate-based polymer resin and polyethylene terephthalate.

The method for preparing the polymer film layer is not specially limited. For example, it may be prepared by preparing a resin composition by sufficiently mixing a selected polymer resin with an additive, etc. through any adequate mixing method and then forming the same into a film.

In the present disclosure, any adequate film forming method may be used to form the film, such as solution casting, melt extrusion, calendering, compression molding, etc. Among the film forming methods, solution casting and melt extrusion are preferred.

The polymer film layer may contain an unstretched film and/or a stretched film. The stretched film may be a uniaxially stretched film or a biaxially stretched film and the biaxially stretched film may be a biaxially stretched film which has been stretched along two axes simultaneously or consecutively. When the biaxially stretched film is used, the performance of the film is improved due to improve mechanical strength. In addition, the film layer may be, for example, heat-treated (annealed) to stabilize optical isotropy or mechanical properties after the stretching. The heat treatment condition is not specially limited and any adequate condition known in the art may be adopted.

Also, in the present disclosure, the adhesion layer contains an adhesive component and an indicator component and is formed on one side of the polymer film layer. The adhesion layer serves to fix the washer by bonding the washer to an upper cap or a cap plate to be described below and to seal the gap between a cap assembly and a battery can.

In a specific exemplary embodiment of the present disclosure, the adhesive component may include a pressure-sensitive adhesive component. The pressure-sensitive adhesive component may include an acryl-based adhesive compound, a rubber-based adhesive compound, a silicone-based adhesive compound, a vinyl ether-based adhesive compound, etc. although not being limited thereto. When the pressure-sensitive adhesive component is used as the adhesive component, it is advantageous in process efficiency in that the washer can be bonded to the upper cap or the cap plate via a simple process of applying a predetermined pressure.

Non-limiting examples of the acryl-based adhesive compound include homopolymer or a copolymer of an acrylic acid ester based-monomer such as a (meth)acrylate-based resin, butyl acrylate, isononyl acrylate, 2-ethylhexyl acrylate, etc., or a copolymer of the acrylic acid ester based-monomer with another monomer such as acrylic acid, 2-hydroxyethyl acrylate, vinyl acetate, etc. Non-limiting examples of the rubber-based adhesive compound include a synthetic polyisoprene rubber, a styrene-isoprene-styrene block copolymer, a natural rubber, polyisobutylene, polybutene, etc.

In the present disclosure, the (meth)acrylate-based resin is one having a resin containing a (meth)acrylate-based unit as a main component. The term is used in a broad concept, including not only a homopolymer resin consisting of a (meth)acrylate-based unit but also a copolymer resin in which the (meth)acrylate-based unit is copolymerized with another monomer unit and a blend resin wherein the (meth)acrylate-based resin is blended with another resin.

The (meth)acrylate-based unit may be, for example, an alkyl (meth)acrylate-based unit. The alkyl (meth)acrylate-based unit means both an alkyl acrylate-based unit and an alkyl methacrylate-based unit. Specifically, the alkyl group of the alkyl (meth)acrylate-based unit may have specifically 1 to 10, more specifically 1 to 4, carbon atoms.

The indicator component may be any one which experiences color change upon contact with the electrolyte and is not limited to a specific component. In a specific exemplary embodiment of the present disclosure, thymol blue, bromophenol blue, methyl orange, bromophenol green, methyl red, bromocresol purple, bromothymol blue (BTB), phenolphthalein, thymolphthalein, indigo carmine, phenol red, etc. may be used as the indicator component, although not being specially limited thereto.

In general, the electrolyte is a salt containing an alkali metal cation such as $Li^+$, $Na^+$ or $K^+$ and an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$ or $C(CF_2SO_2)_3^-$ dissolved or dissociated in an organic solvent such as propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone or a mixture thereof and is weakly acidic at pH 3.0-4.5. Therefore, it is preferred to use methyl orange, methyl red, etc. as an indicator component which exhibits distinct reactivity for the electrolyte within the acidity range.

In the present disclosure, the adhesion layer may contain the indicator component in an amount of 1-10 wt % based on 100 wt % of the adhesion layer, although not being specially limited thereto. When the amount of the indicator component is well below the above range, it may be difficult to detect the leakage of the electrolyte with naked eyes because color change is not distinct. In contrast, when the amount of the indicator component is well above the range, adhesion to the upper cap or the cap plate may be unsatisfactory due to the insufficient content of the adhesive component.

Figure 6A:
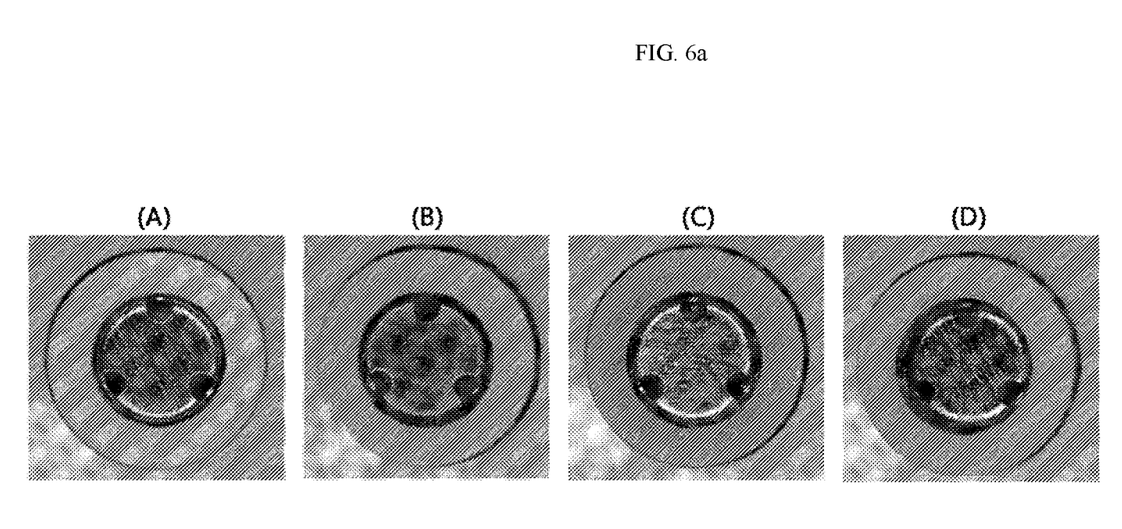
FIG. 6a and FIG. 6b show a result of intentionally leaking an electrolyte from secondary batteries prepared in Example and Comparative Example of the present disclosure and inducing color change of washers.
Figure 6B:
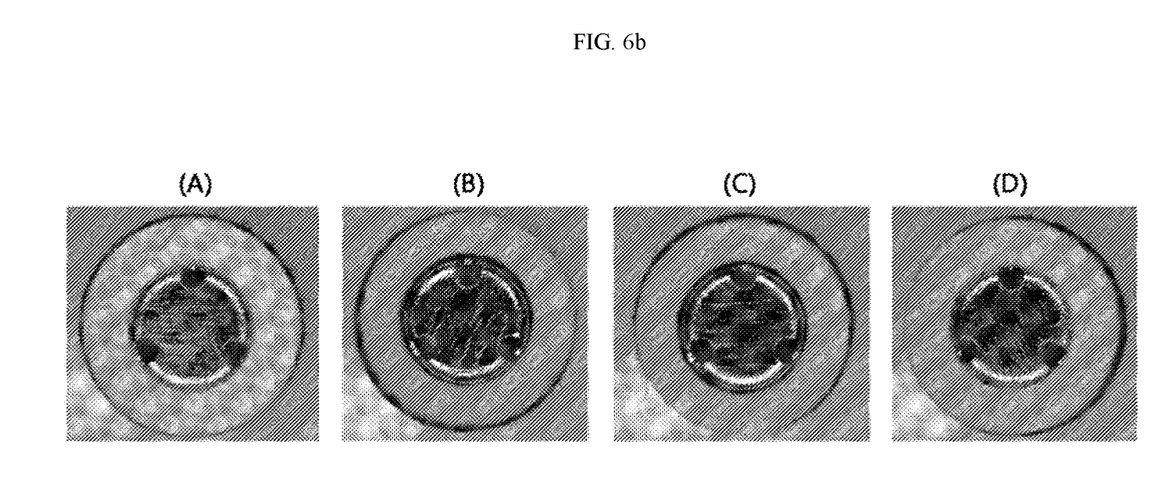

FIGS. 6a and 6b show a result of intentionally leaking electrolytes out of battery cans of secondary batteries having washers according to a specific exemplary embodiment of the present disclosure and a comparative example by applying pressure to the secondary batteries and inducing color change of the washers by contacting the electrolyte with the washers. FIG. 6a shows images of the secondary battery according to the exemplary embodiment of the present disclosure. It can be seen that the color change of the adhesion layer containing the indicator component is easily detected because the outermost layer of the washer is made of a transparent polymer film and that corrosion of the secondary battery did not occur as compared to the comparative example shown in FIG. 6b.

In a specific exemplary embodiment of the present disclosure, the washer may further include an absorbent material that can absorb the leaked electrolyte. The absorbent material may include one or more selected from a group consisting of rayon, viscose rayon, polyviscose and polynoisic. Specifically, polynosic may be used.

The thickness of the washer may vary depending on what it is made of and is not particularly limited. Specifically, it may have a thickness of 0.05-2 mm, 0.1-1.5 mm, 0.1-1 mm or 0.1-0.8 mm. The thickness of the washer affects its mechanical rigidity, elasticity, etc. When the thickness of the washer is too small, a desired mechanical rigidity, etc. may not be achieved and the washer may break even by a weak external impact. On the contrary, when the thickness of the washer is too large, the battery size is undesirably increased significantly. Therefore, the thickness may be determined within the above range in consideration of these factors.

The washer mounted at the cap assembly may be fixed in various ways. For example, it may be fixed by mechanical coupling wherein the outer periphery of the washer is fixed together during clamping of the cap assembly or the outer periphery of the washer is fixed together while a heat-shrinkable tube mounted at the outer surface of the can shrinks or by bonding wherein the washer and the cap assembly are bonded by applying an adhesive on the lower surface of the washer or on the upper surface of the cap assembly.

In the present disclosure, the metal can may be a cylindrical can or a prismatic can. As an example, when it is a cylindrical can, the cap assembly may have a protruding cathode terminal connected to an electrode assembly formed at the center and the cylindrical can and the cap plate may form an anode terminal while being insulated from the cathode terminal.

As another example, when it is a prismatic can, the cap assembly may have a protruding anode terminal connected to an electrode terminal formed at the center and the prismatic can and the cap plate may form a cathode terminal while being insulated from the anode terminal.

Hereinafter, the present disclosure is described in further detail referring to a drawing showing another exemplary embodiment. However, the scope of the present disclosure is not limited thereby.

Figure 2:
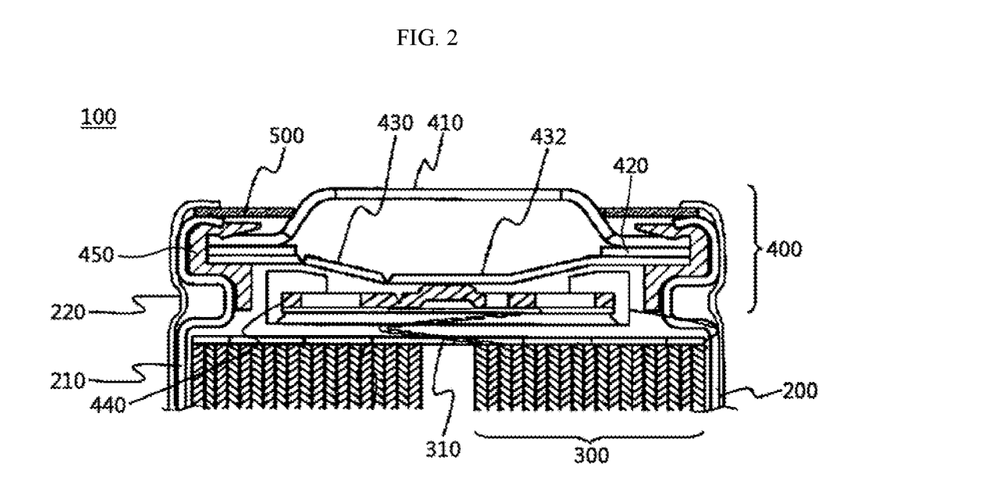
FIG. 2 and FIG. 3 schematically show the configuration of a secondary battery according to an exemplary embodiment of the present disclosure.

FIG. 2 is a partial cross-sectional view schematically showing the configuration of the upper portion of a cylindrical secondary battery according to an exemplary embodiment of the present disclosure.

Referring to these figure, a battery 100 according to the present disclosure is prepared by inserting an electrode assembly 300 as a power-generating device into a can 200, injecting an electrolyte therein, mounting a cap assembly 400 at an open upper end of the can 200 and then applying a predetermined heat after inserting a heat-shrinkable tube 220 into the can 200.

The cap assembly 400 contains an overcurrent-limiting PTC device 420 and a safety vent 430 for lowering internal pressure. Specifically, inside a gasket 450 for sealing mounted on an upper beading portion 210 of the can 200, the PTC device 420 for interrupting overcurrent to an upper cap 410 and the safety vent 430 for lowering internal pressure are provided. The central portion of the upper cap 410 protrudes upward and, therefore, the upper cap 410 serves as a cathode terminal for connection with an external circuit. The safety vent 430 has a lower end to which a cathode of the power-generating device 300 is connected through a current-interrupting element 440 and a cathode lead 310.

The safety vent 430 is made of a thin conductive plate and has a downwardly indented portion 432 at the center thereof. The indented portion 432 has an upper bent portion and a lower bent portion in which two notches having different depths are formed respectively.

A washer 500 is in the form of a circular disk such that it can be mounted on the beading portion 210 while surrounding the upper cap 410 of the cap assembly 400. When the heat-shrinkable tube 220 shrinks while surrounding the outer periphery of the washer 500, the washer 500 is coupled to the cap assembly 400.

The washer 500 prevents internal short circuits occurring as the upper cap 410 as a cathode terminal contacts with the can 200 as an anode terminal. In addition, the washer 500, being made of an electrolyte-absorbing material, serves to absorb the electrolyte when the cylindrical can is damaged, for example, by external impact and the electrolyte leaks along the interface between the beading portion 210 and the gasket 450.

Figure 3:
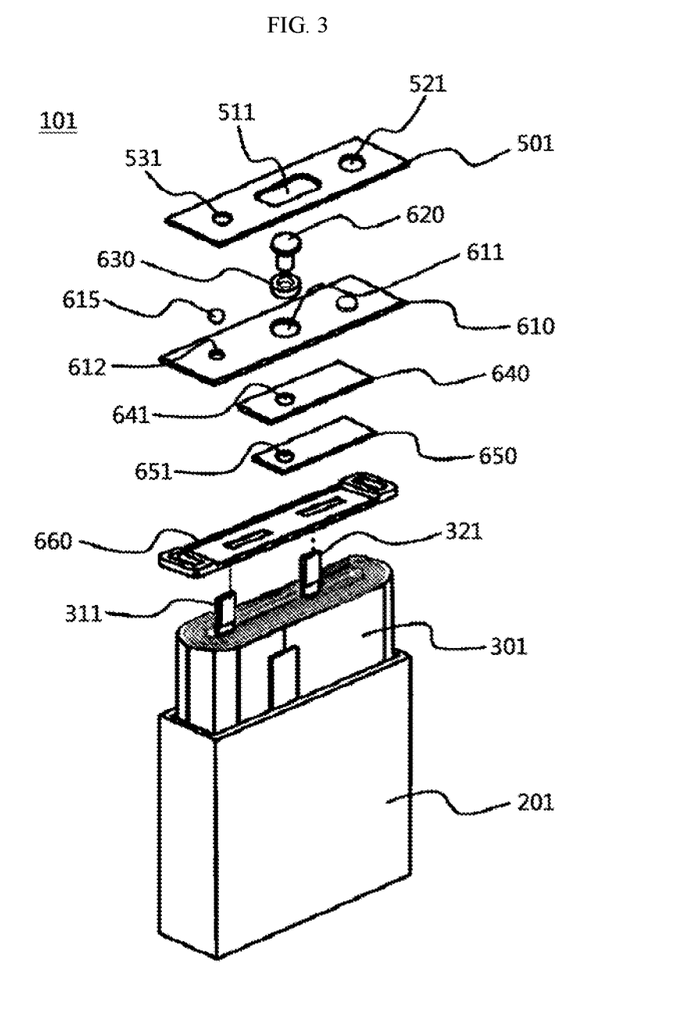

FIG. 3 is an exploded perspective view of a prismatic battery according to another exemplary embodiment of the present disclosure. Referring to FIG. 3, a secondary battery 101 includes a can 201 having an open upper end, an electrode assembly 301 accommodated inside the can 201, a cap assembly 600 including a cap plate 610 which is coupled to the open upper end of the can 201 and a washer 501 mounted on the cap plate 610.

The can 201 is made of a metal material in the form of a roughly rectangular parallelepiped and can serve as a terminal itself. The cap assembly 600 includes the cap plate 610, an insulating member 640, a terminal plate 650 and an electrode terminal 620.

The cap plate 610 is made of a metal plate having a size and a shape corresponding to those of the open upper end of the can 201 and a first terminal opening 611 into which the electrode terminal 620 is inserted is formed at the center thereof.

The electrode terminal 620 serves as an anode terminal as being connected to a first electrode tab 311 or a second electrode tab 321. When the electrode terminal 620 is inserted into the first terminal opening 611, a tube-shaped gasket 630 coupled to the outer surface of the electrode terminal 620 is inserted together for insulation of the electrode terminal 620 and the cap plate 610.

At one side of the cap plate 610, a safety vent is formed by forming a groove with a predetermined depth to reduce its thickness or by forming a hole and welding a thin plate to the hole so that, when pressure increases inside the battery or explosion occurs, the safety vent is ruptured at a lower pressure. And, at the other side, an electrolyte injection hole 612 of a predetermined size is formed. The electrolyte injection hole 612 serves as a passage for injecting the electrolyte after the cap assembly 600 is assembled to the opening of the can 201, and is sealed with a metal ball 615.

The insulating member 640 is formed of an insulating material as the gasket 630 and is coupled to the lower side of the cap plate 610. The insulating member 640 has a second terminal opening 641 formed at a location corresponding to the first terminal opening 611 of the cap plate 610.

The terminal plate 650 is coupled to the lower side of the insulating member 640 and has a third terminal opening 651 into which the electrode terminal 620 is inserted formed at a location corresponding to the first terminal opening 611 of the. Accordingly, the electrode terminal 620 is electrically connected to the terminal plate 650 while being electrically insulated from the cap plate 610 by the gasket 630.

In addition, a top insulator 660 covering the upper end of the electrode assembly 301 is mounted on the electrode assembly 301 to electrically insulate the electrode assembly 301 and the cap assembly 600, and the electrode terminal 620 is connected to an external terminal via an electrode lead wire (not shown).

When the electrode terminal 620 is connected to the second electrode tab 321, the cap plate 610 is connected to the first electrode tab 311. Therefore, the cap plate 610 connected to the electrode terminal 620 should be insulated. Accordingly, the washer 501 is mounted on the cap plate 610, i.e., between the cap plate 610 and the electrode terminal 620.

The washer 501 is made of an electrically insulating and absorbent material capable of absorbing the electrolyte. An electrode terminal hole 511 is formed at its center so that the electrode terminal 620 connected to the electrode lead wire (not shown) is exposed. On one side of the washer 501, a safety vent hole 521 is formed as a portion where the safety vent is exposed. On the other side, an injection hole 531 is formed such that the electrolyte injection hole 612 is opened.

Accordingly, even when the electrolyte leaks out of the can 201 for various reasons, it is immediately absorbed by the washer 501. Therefore, internal short circuits caused by corrosion of a PCM (not shown) mounted on the upper end of the battery 101 can be prevented, for example.

Also, in the present disclosure, the electrode assembly 300 is configured as a cathode plate and an anode plate arranged with a separator therebetween. The electrode assembly 300 may have a structure in which one cathode plate and anode plate are wound with a separator therebetween or a structure in which a plurality of cathode plates and a plurality of anode plates are wound with a separator therebetween. Each of the cathode plate and the anode plate may be formed to have a structure in which an active material slurry is coated on a current collector. In general, the slurry may be formed by stirring a mixture of a granular active material, an auxiliary conductor, a binder, a plasticizer, etc. in a solvent.

The electrode assembly 300 may have an uncoated region where the slurry is not coated on the electrode plate. An electrode tab corresponding to each electrode plate may be provided on the uncoated region. That is to say, a cathode tab (not shown) may be attached to the cathode plate of the electrode assembly 300 and an anode tab (not shown) may be attached to the anode plate of the electrode assembly 300. The respective tabs are connected to different elements such as the electrode lead.

Specifically, the secondary battery according to the present disclosure may be a lithium secondary battery. The present disclosure also provides a battery pack or a mid- to large-sized battery module which includes the secondary battery as a unit cell.

In particular, the secondary battery according to the present disclosure may be used in a high-power, large-capacity battery requiring long shelf life and superior durability or a mid- to large-sized battery module which includes a plurality of the batteries as unit cells. The mid- to large-sized battery module may be used as a power source in, for example, electric automobiles, hybrid electric automobiles, plug-in hybrid electric automobiles, electric motorcycles, electric motorcycles, etc.

The battery pack according to the present disclosure may further include, in addition the secondary battery, various protective devices for controlling charging and discharging of the secondary battery such as a BMS (battery management system).

Hereinafter, the present disclosure is described in more detail through examples. However, the following examples are only for illustrating the present disclosure and the scope of the present disclosure is not limited by them.

EXAMPLES

1. Preparation of Washer

A transparent polyethylene terephthalate film with a thickness of 105 μm and a turbidity of 15% or lower was prepared. Then, an acryl-based adhesive (AKITACK® P-Series) and a methyl orange indicator mixed at a weight ratio of 97:3 was coated on the film to a thickness of 100 μm and then dried. As a result, a washer having an adhesion layer formed was prepared.

2. Preparation of Secondary Battery

An upper cap and a cylindrical can was prepared using Ni-plated SPCE (cold-rolled steel plate). After accommodating an electrode assembly in the cylindrical can, an electrolyte was injected. The electrolyte was prepared by adding $LiPF_6$ to an organic solvent mixture of ethylene carbonate and ethyl propionate at a weight ratio of 5:5 to a concentration of 1 M. A cylindrical secondary battery was prepared by cutting the washer prepared in Example 1 adequately, mounting it on a beading portion so that it surrounded an upper cap of a cap assembly and sealing the upper end of the cap assembly while surrounding the outer surface of the can with a heat-shrinkable tube. After inverting the secondary battery and inducing leakage of the electrolyte by applying a pressure of 30 kgf into the cell, the color change of the washer was observed.

Comparative Examples

1. Preparation of Washer Using Litmus Paper

A litmus paper was prepared. A washer having an adhesion layer formed was prepared by coating an acryl-based adhesive (AKITACK® P-Series) on one side of the litmus paper to a thickness of 100 μm and drying the same.

2. Preparation of Secondary Battery

An upper cap and a cylindrical can was prepared using Ni-plated SPCE (cold-rolled steel plate). After accommodating an electrode assembly in the cylindrical can, an electrolyte was injected. The electrolyte was prepared by adding $LiPF_6$ to an organic solvent mixture of ethylene carbonate and ethyl propionate at a weight ratio of 5:5 to a concentration of 1 M. Then, a cylindrical secondary battery was prepared by cutting the washer prepared in Comparative Example 1 adequately, mounting it on a beading portion so that it surrounded an upper cap of a cap assembly and sealing the upper end of the cap assembly while surrounding the outer surface of the can with a heat-shrinkable tube.

Evaluation

Evaluation of Reactivity

An electrolyte was dropped onto the adhesion layer (back side) of each of the washers prepared in Example 1 and Comparative Example 1. The electrolyte was prepared by adding $LiPF_6$ to an organic solvent mixture of ethylene carbonate and ethyl propionate at a weight ratio of 5:5 to a concentration of 1 M. After the electrolyte was dropped, the color change of the washer was observed on the opposite side (front side) to the adhesion layer.

Figure 4A:
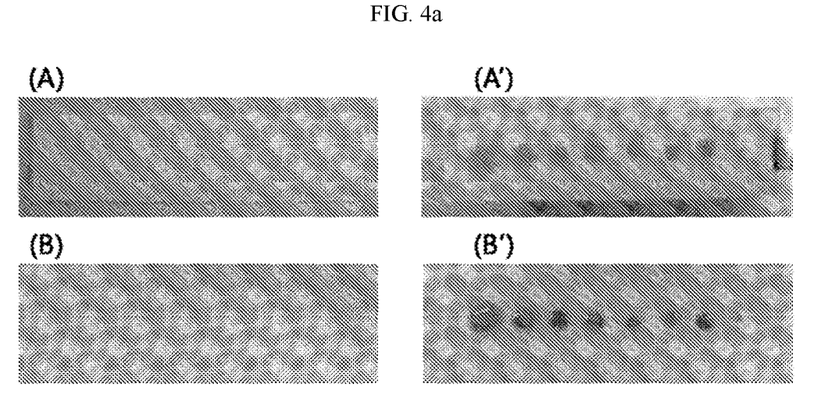
FIG. 4a and FIG. 4b show a result of dropping an electrolyte onto a washer according to the present disclosure and a washer using litmus paper of Comparative Example and observing color change.

FIG. 4a shows the result of dropping the electrolyte on the washer prepared in Example 1. As the electrolyte dropped on the adhesion layer at the back side of the washer reacted with the indicator component methyl orange contained in the adhesion layer, the washer turned red. The color change could be clearly seen from the front side of the washer through the polymer film layer.

Figure 4B:
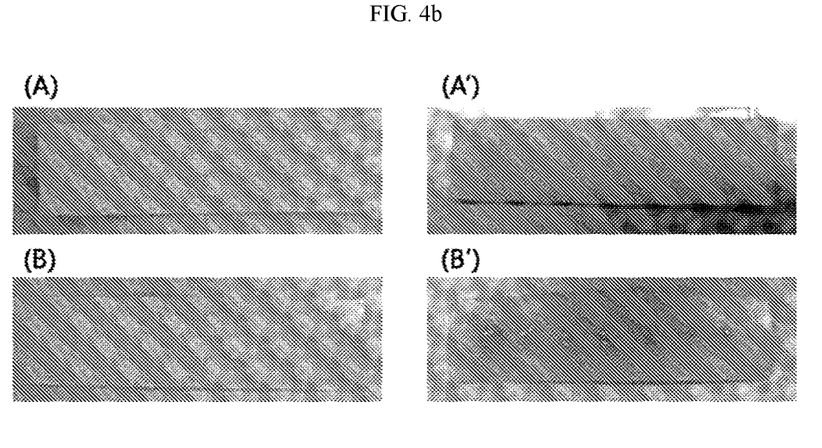

FIG. 4b shows the result of dropping the electrolyte on the washer prepared in Comparative Example 1. From FIG. 4b, it can be seen that the color change of the adhesion layer (back side) by the dropped electrolyte is not clearly seen when observed through the litmus paper layer (front side).

In FIG. 4a and FIG. 4b, (A) and (A') represent the front side and (B) and (B') represent the back side.

Evaluation of Battery Corrosion

Figure 5A:
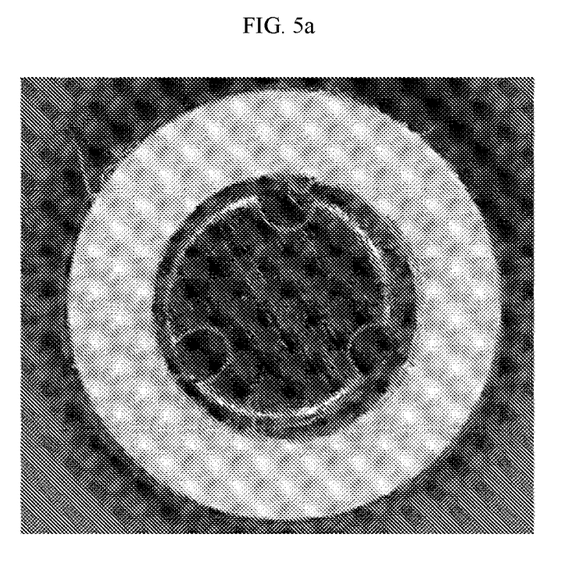
FIG. 5a and FIG. 5b show a result of keeping secondary batteries prepared in Example and Comparative Example of the present disclosure for several days under a hot and humid environment and checking corrosion of the batteries.
Figure 5B:
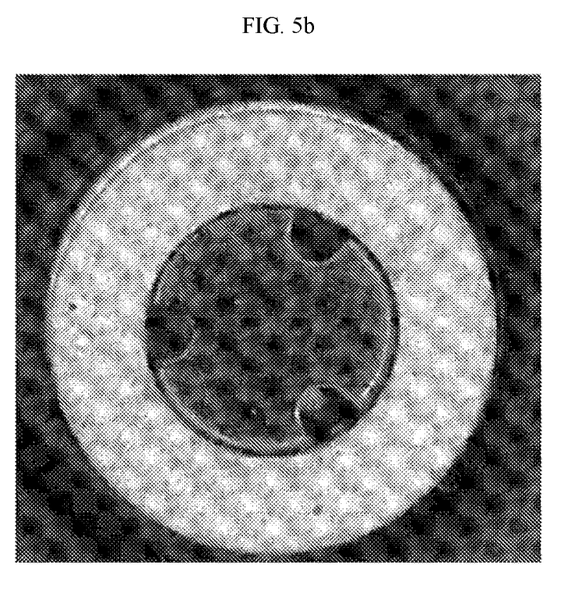

The batteries prepared in Example 2 and Comparative Example 2 were kept under the condition of 65 □ and 90% relative humidity for 7 days and then the degree of corrosion of the batteries was investigated. FIG. 5b shows the result for the battery prepared in Comparative Example 2. From FIG. 5b, it can be seen that corrosion occurred throughout the whole battery when it was kept under the hot and humid environment because the litmus paper absorbed moisture. In contrast, no corrosion occurred in Example 2 wherein the polymer film layer was used instead of the litmus paper because the film layer acted as a moisture barrier (see FIG. 5a).

Observation of Color Change of Washer

After inverting the secondary batteries prepared in Example 2 and Comparative Example 2 and inducing leakage of the electrolyte by applying a pressure of 30 kgf into the cell, the color change of the washer was observed. For the battery of Example 2, the leakage of the electrolyte could be detected easily with naked eyes because the color change of the washer could be observed through the film layer. In contrast, for the battery of Comparative Example 2, the color change of the litmus paper before and after the leakage of the electrolyte was not detected clearly.

In FIG. 6a and FIG. 6b, (A) is the image before the leakage of the electrolyte and (B), (C) and (D) are the images showing color change after the leakage of the electrolyte.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A secondary battery, comprising:
a metal can having an upper open end;
an electrode assembly comprising a cathode, a separator and an anode in the metal can; and
a washer covering the metal can upper open end,
wherein the washer comprises:

a polymer film layer; and an adhesion layer formed on one side of the polymer film layer, wherein the adhesion layer comprises an adhesive component and an indicator component and experiences a color change upon contact with an electrolyte, wherein the polymer film layer is made of a transparent material or a semitransparent material so that the color change of the adhesion layer is observable from outside of the secondary battery through the polymer film layer, and wherein the washer is mounted on a beading portion of the metal can, surrounds an upper cap of a cap assembly of the metal can, and seals the upper end of the cap assembly of the metal can.

2. The secondary battery according to claim 1, wherein the polymer film layer comprises one or more polymer resin selected from a group consisting of a polyolefin-based polymer resin, an acryl-based polymer resin, a polycarbonate-based polymer resin, a vinyl-based polymer resin, an ABS (acrylonitrile butadiene styrene) resin, a polystyrene-based polymer resin, polycarbonate-based polymer resin, tetrafluoroethylene, Teflon, polybutyl terephthalate and polyethylene terephthalate.

3. The secondary battery according to claim 2, wherein the polyolefin-based resin is one or more selected from a group consisting of low-density polyethylene (LDPE), linear low-density polyethylene (LLDPE), high-density polyethylene (HDPE), ultra-high-molecular-weight polyethylene (UHMWPE), polypropylene, polybutene, polymethylpentene and a copolymer thereof.

4. The secondary battery according to claim 1, wherein the polymer film layer comprises one or more selected from a group consisting of polypropylene, a polycarbonate-based polymer resin and polyethylene terephthalate.

5. The secondary battery according to claim 1, wherein the adhesive component comprises one or more selected from a group consisting of an acryl-based adhesive compound, a rubber-based adhesive compound, a silicone-based adhesive compound and a vinyl ether-based adhesive compound.

6. The secondary battery according to claim 5, wherein the acryl-based adhesive compound comprises a homopolymer or a copolymer of an acrylic acid ester based-monomer, or a copolymer of the acrylic acid ester based-monomer with a monomer selected from acrylic acid, 2-hydroxyethyl acrylate and vinyl acetate.

7. The secondary battery according to claim 1, wherein the indicator component comprises one or more selected from a group consisting of thymol blue, bromophenol blue, methyl orange, bromophenol green, methyl red, bromocresol purple, bromothymol blue (BTB), phenolphthalein, thymolphthalein, indigo carmine and phenol red.

8. The secondary battery according to claim 1, wherein the washer is fixed to the upper side of the cap assembly through adhesion or mechanical coupling.

9. The secondary battery according to claim 1, wherein the washer has a thickness of 0.05-2 mm.

10. The secondary battery according to claim 1, wherein the metal can is a cylindrical metal can.

* * * * *